April 28, 1953     D. E. HOLLOWAY     2,636,384
TESTING DEVICE FOR AIRCRAFT LOAD RELEASE MECHANISM
Filed Sept. 16, 1948     2 SHEETS—SHEET 1

Daniel E. Holloway
*INVENTOR.*

BY *James H. Clark*
ATTORNEY

April 28, 1953     D. E. HOLLOWAY     2,636,384
TESTING DEVICE FOR AIRCRAFT LOAD RELEASE MECHANISM
Filed Sept. 16, 1948     2 SHEETS—SHEET 2

Daniel E. Holloway
*INVENTOR.*

BY *James M. Clark*
ATTORNEY

Patented Apr. 28, 1953

2,636,384

UNITED STATES PATENT OFFICE 2,636,384

TESTING DEVICE FOR AIRCRAFT LOAD RELEASE MECHANISM

Daniel E. Holloway, Inglewood, Calif., assignor to North American Aviation Inc.

Application September 16, 1948, Serial No. 49,504

16 Claims. (Cl. 73—167)

The present invention relates to aircraft bomb and load-carrying means and more particularly to improved devices for testing bomb rack and other load releasing equipment for aircraft.

In the installation and testing of ordnance equipment upon aircraft it is desirable in certain instances that the equipment be tested under actual flight conditions. When such equipment is tested in flight the actual condition under which the equipment will be required to function, such as temperature, effect of the air stream, the flight attitude of the airplane, and similar conditions, can be applied to the particular equipment.

Heretofore in testing of aircraft bomb racks it has been necessary to release dummy practice bombs from the airplane during flight and this operation involved considerable risk to persons and property unless the flights were made over unpopulated areas, designated bombing ranges, or over the ocean. Normally such dummy or test bombs comprise a steel casing filled with sand to approximate the weight of a 500 or 1,000 pound bomb. The bomb was loaded into each of the bomb racks, which may either be in the wing or within the fuselage, and the airplane was taken aloft by a test pilot, and flown for the required period at a specified altitude to permit the rack mechanism to become tempered in accordance with the prevailing temperature of the surrounding air at that altitude. After the racks have been so tempered the bombs were released to check for malfunction of the equipment. This procedure necessitated the wasting of the dummy bomb, as well as the expenditure of a considerable additional amount of time consumed in climbing to altitude with the heavy load and the accompanying expenditure of additional gasoline. Inasmuch as such test bombs could only be released over certain safe areas such as bombing ranges, or over the ocean, the aircraft was frequently required to travel considerable distances to and from the testing points.

The present invention is directed to an improved bomb rack testing device which may be readily attached to the existing bomb rack carried by the airplane for testing the same under actual flight conditions without the necessity of attaching test bombs and the subsequent release of such bombs from the airplane during flight. The improved testing device consists essentially of a readily attachable unit containing an operating spring and means for attaching and loading the same to simulate the bomb load upon the bomb rack hooks. The loading spring is cocked manually by a cocking lever when the device is in its proper position to impose the desired tension of a pair of shackles upon the bomb rack hooks. After the airplane has been flown to the desired altitude, and tempered to the prevailing temperature conditions, the operation of the bomb release gear may be tested by operating the controls in the customary manner without the use of a test or dummy bomb. In a preferred form of the present device a micro-switch is provided as part of the testing unit, serving to energize the circuit of a signal lamp positioned as to be visible by the pilot, or test personnel, within the aircraft to indicate proper functioning or operation of the test device.

It is accordingly a major object of the present invention to provide an improved bomb rack testing device which obviates the necessity of attaching a test or dummy bomb to the bomb rack. It is a further object of the present invention to provide an improved testing device of this type which may be readily attached to or detached from the conventional bomb rack without the necessity of modifying or altering the same. A further object of this invention lies in the provision of a bomb rack testing device which can be operated under the same conditions of altitude, temperature, pressure of the airstream and other conditions to which the actual bombs and racks will be subjected in normal flight operations. It is also an object to provide means for testing the releasing mechanisms for droppable tanks and other cargo or load items.

A further object of the present invention resides in the provision of improved testing equipment in which the bomb-engaging hooks of the bomb rack may be subjected to the action of a cocking spring which simulates the loading of the hooks by a bomb of a predetermined weight. It is a further objective to provide, in such a test device, signal means for indicating to the test personnel within the aircraft whether the bomb release mechanism is functioning properly. It is also an object of this invention to provide auxiliary means within the improved test device for the testing of the arming wire release mechanism. Other objects and advantages of the present invention will occur to those skilled in the art after reading the present description taken together with the accompanying drawings, forming a part hereof, in which:

Figure 1:
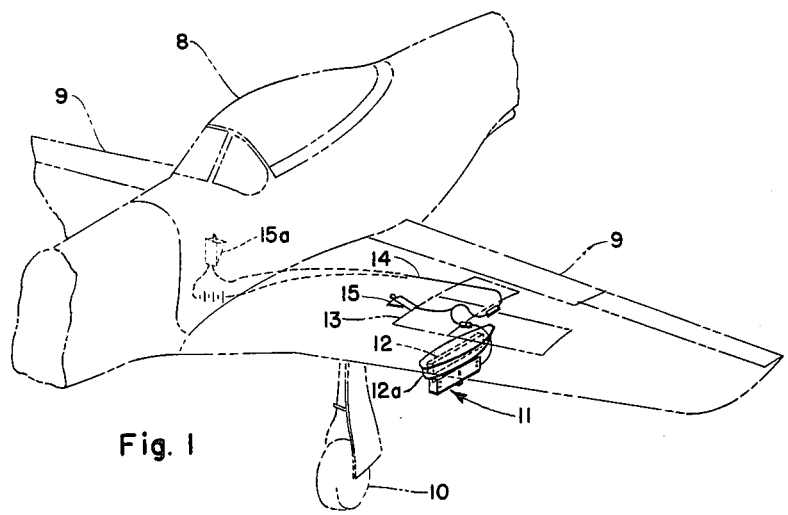
Fig. 1 is a perspective view of the improved testing device shown attached to a bomb rack carried beneath the wing of an airplane.

Referring now to Fig. 1, the numeral 8 represents the fuselage of an airplane having laterally extending sustaining surfaces or wings 9 and a landing gear unit indicated by the numeral 10. The improved bomb rack testing device 11 of the present invention is shown attached to the conventional wing bomb rack 12, within its fairing 12a, suspended beneath the wing 9. It will be understood that the airplane may be provided with a pair of laterally disposed landing gear units 10, and a plurality of wing bomb rack units 12, only one of which is shown, to each of which bomb racks may be attached a test device 11.

The wing 9 is also provided with an upper surface access door 13 which is otherwise of conventional type and is usually provided for the installation and servicing of the bomb rack, its attachments and mechanisms, as well as wing type machine guns which may be adjacently located within the wing 9. Electric wiring is indicated by the numeral 14 extending from a micro-switch within the test device to a suitable power source within the airplane, which may be one of the gun heater connections, or the usual source of electric power within the main system of the aircraft. The micro-switch will be described in greater detail below in conjunction with Fig. 2 and serves to close the circuit to energize an electric lamp or other signalling means 15, more particularly shown in Fig. 7, which is disposed such that it is visible to the pilot or other test personnel within the cockpit of the airplane. In an improved and subsequent arrangement the lamp has been installed within the pilot compartment as shown at 15a.

Figure 2:
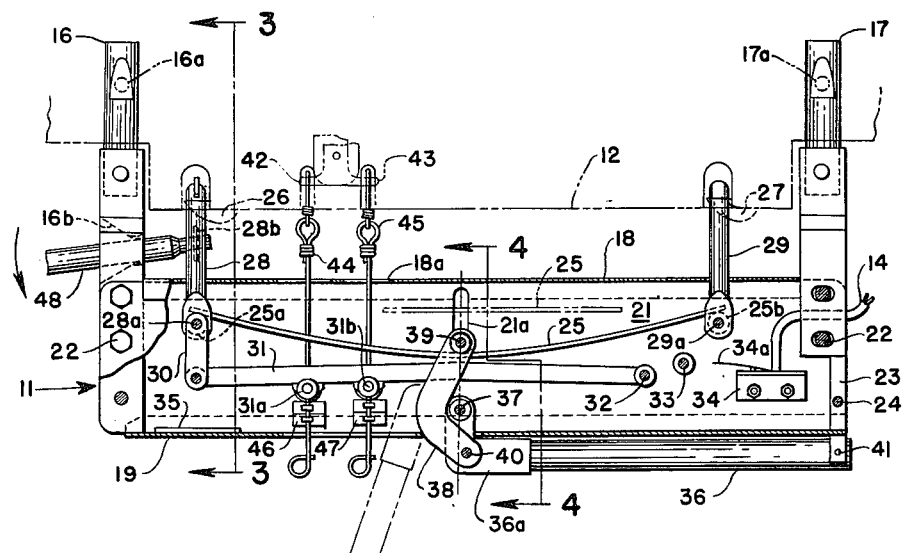
Fig. 2 is an enlarged elevational view of the improved bomb rack testing device partly broken away.
Figure 5:
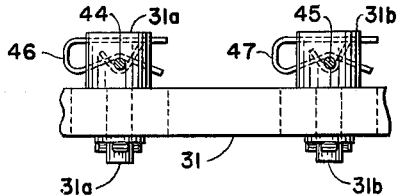
Fig. 5 is a fragmentary plan view of parts of the arming wire connections of Fig. 2.
Figure 3:
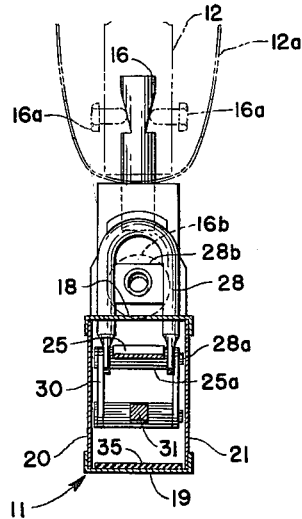
Fig. 3 is a sectional elevational view of the device as taken along the lines 3—3 of Fig. 2.
Figures 4, 6:
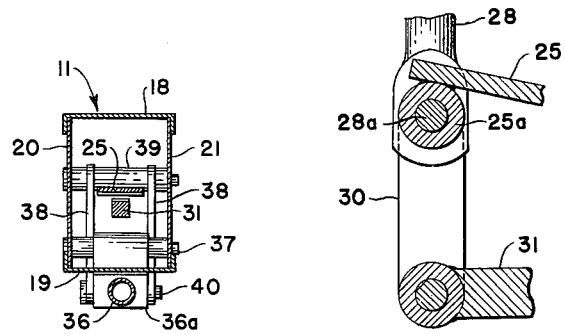
Fig. 4 is a similar sectional view taken along the lines 4—4 of Fig. 2.
Fig. 6 is an enlarged sectional view of one of the terminals of the spring of the test device.

Referring now to the assembly in Fig. 2, and the details of Figs. 3 to 5 inclusive, the improved device or testing fixture comprises a framework 11 depending from the front and rear post assemblies 16 and 17, respectively, which are inserted and locked in the bomb sway brace post holes in the conventional bomb rack 12. The posts or studs 16 and 17 are provided with beveled faces arranged to be engaged by the locking bolts 16a and 17a, as shown in Figs. 2 and 3. The lower portions of the posts or studs 16 and 17 are of rectangular block form and serve to space the lateral or side sheets 20 and 21, over which the flanged top and bottom sheets 18 and 19 are fitted to form a cover and a base, respectively, for the test fixture 11. The side sheets 20 and 21 are attached to the end blocks by means of the through bolts 22 and at the aft end of the testing fixture the lower portion is filled by a yoke block 23 which similarly serves to laterally space the side sheets 20 and 21 to which the block is attached by the through bolt 24. The lower portion of the block 23 is formed into a semi-circular yoke to receive the cocking lever or loading handle 36, to be hereinafter more fully described.

The test device or fixture 11 includes a loading spring 25, preferably of a heavy single leaf type having bored cylindrical stud terminal elements 25a and 25b welded or otherwise fixedly attached to its ends. The loading spring 25 is of sufficient length that its terminals are disposed beneath the bomb rack hooks 26 and 27 which are engaged by the shackles 28 and 29 of inverted U-shape. These shackles have their lower ends flattened and bored to receive the transverse pins 28a and 29a, by which the shackles are pivotally connected to the terminals 25a and 25b of the loading spring 25. A pair of vertically disposed links 30 are also pivotally suspended from the forward shackle pin 28a and are pivotally connected to the forward end of a rigid arm or beam 31 which is pivotally mounted to rock about the fixed axis of the transverse pivot or fulcrum 32 disposed towards the aft portion of the device.

The cocking arm, or loading handle 36 is provided with an angular terminal portion 36a and is pivotally mounted to swing about the axis of the pivot 37. A pair of angular links 38 are pivotally interconnected at their upper terminals by the pin and bushing 39 which is arranged to be guided for vertical movement within slots in the side plates 20 and 21, as indicated by the slot 21a in the side plate 21 in Fig. 2. The lower terminals of the angular links 38 are pivotally connected by the pin 40 to the terminal fitting 36a in the loading handle 36. The upper pin and bushing 39 is adapted to bear upon the upper face of the leaf spring 25, which is restrained from downward movement by the attachment of its end terminals to the lower ends of the shackles 28 and 29.

With the loading handle 36 rotated downwardly about its pivot 37, the spring 25 will lift the angular links 38 upwardly in such manner that when the loading handle is caused to reach the dotted position of Fig. 2 the spring will have straightened out into its upper dotted position as also shown in this figure. Conversely as the loading handle is rotated rearwardly and upwardly in the direction of the arrow in this figure, the spring will be placed under tension, assuming the shackles 28 and 29 are placed in position on the bomb rack hooks 26 and 27. Inasmuch as the axis of the pivot 40 is slightly beyond the vertical dead center line extending between the axes of the pivots 37 and 39 the handle 36 will be retained against the bottom plate 19 by the tension of the spring 25, but apertures are also provided for a safety cotter pin 41 for locking the handle 36 within the yoke member 23 to prevent inadvertent or undesired movement of the handle due to vibration of the airplane during flight, or from other causes.

The above mentioned beam 31 is provided with a pair of attached lugs 31a and 31b for the purpose of simultaneously loading or tensioning the arming wire release catches 42 and 43, respectively. Arming wires 44 and 45, with upper eye terminals are engaged with the release catches 42 and 43, and extend downwardly alongside, or through apertures, provided in the leaf spring 25, through apertures in the lugs 31a and 31b to their lower pull terminals. These wires as well as the shackles 28 and 29 also pass through openings 18a in the top sheet 18 of the assembly. In order that the arming wires 44 and 45 may be subjected to the loading of the spring 25 there are provided pairs of adjustable wire engaging clips 46 and 47, as shown in detail in Fig. 5, which when adjusted are slid upwardly along each of the wires until the upper edges of the clips are in engagement with the lower faces of the lugs 31a and 31b.

Adjacent to the pivot 32 of the beam 31 there is positioned a stop pin 33 which serves to limit the downward movement of the adjacent end of the spring 25. Further aft of the stop pin 33 is disposed the micro-switch 34 having its spring contact engaging portion 34a extending forwardly into the path of the terminal 25b on the adjacent end of the spring 25. The electric leads 14 extend from the micro-switch 34 to the power source referred to above and are in circuit with the indicating lamp 15 as shown in the arrangement in Fig. 1, and more fully described in connection with Fig. 7. Downward movement of the links 30 and the adjacent terminal of the arm 31 is limited and resiliently absorbed by the buffer pad, or bumper plate 35 suitably fastened to the upper face of the lower plate 19.

To facilitate placing the forward shackle 28 upon the bomb rack hooks 26 a rack cocking bar or rod 48 is provided, being inserted through the conic slot 16b formed within the terminal post block 16. The rod 48 has its reduced diameter end engageable with the opening in the plate 28b extending between the sides of the forward shackle 28. When the rack cocking bar 48 is not in use it may be stored within the hollow tubular handle of the loading lever 36 and retained therein by a similar cotter pin as indicated at 41, or other suitable means.

Figure 7:
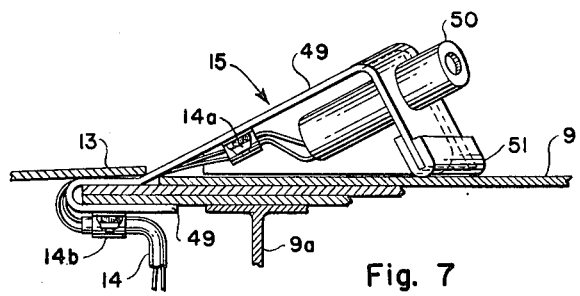
Fig. 7 shows a signal lamp, and its support, for indicating the operation of the test device.

The details of one of the indicating or signal lamps 15 are shown in Fig. 7 in which the numeral 9 represents the surface of the wing having a rib or chordwise bulkhead member 9a, adjacent which is the access cover 13. The leads 14 extend from within the wing structure out beneath the access cover 13, being clipped as at 14a and 14b to the lamp base plate 49 within which the lamp housing 50 is supported. The lower end of the lamp base plate 49 is bent as at 49a such that it may be clamped upon the edge of the cover sheet of the wing and its outer end is preferably provided with a guard piece 51 of rubber, metal, or other material, to prevent scoring of the outer skin surface.

The operation of the improved testing device is as follows:

With the bomb removed from the rack, and the fore and aft sway brace posts removed from their sockets within the bomb rack 12, the corresponding fore and aft post members 16 and 17 of the test fixture 11 are inserted upwardly and the locking bolts 16a and 17a tightened against the post elements. With the loading handle moved downwardly and forwardly to relieve the spring 25, the rear shackle 29 is positioned over the rear bomb rack hooks 27 and the forward shackle 28 lifted (by means of the rack cocking bar 48 if necessary) upwardly into its position upon the forward bomb rack hooks 26. Rearward movement of the handle 36 into its full line position causes loading or deflection of the spring 25 and the handle 36 is saftied by the cotter pin 41 to positively retain the spring 25 in the loaded position until the hooks 26 and 27 on the bomb rack are released. In order that the arming release hooks or catches 42 and 43 may be simultaneously tested, the arming wires 44 and 45 are passed through the lugs 31a and 31b and the clips 46 and 47 attached upon the wires to bear upwardly against the lower surfaces of the lugs.

The airplane is then ready to be flown to the altitude at which the desired temperature and other conditions may prevail, and when desired by the operator the bomb rack hooks 26 and 27 may be released in the customary manner permitting the spring 25 to draw the shackles 28 and 29 downwardly, simulating the dropping of the bomb away from the bomb rack, until the spring 25 again assumes a straight or flat condition. In dropping, or snapping down, to this position its aft terminal strikes the engaging spring 34a of the micro-switch 34 thereby closing the circuit and indicating to the operator that the shackles have been pulled downwardly from the hooks 26 and 27, or in other words that the equivalent of the test bomb has been dropped. As the forward shackle 28 is pulled downwardly under the influence of the straightening spring 25, the forward end of the beam 31 is also caused to move downwardly about its pivot 32, thereby giving an indication of the operability of the arming wires 44 and 45 and their associated mechanism. The handle 36 remains in its retracted position until the airplane returns to its base for a subsequent test, or the substitution of its normal bomb load. It will be understood that merely by the substitution of springs 25 of different size or stiffness, bombs of varying weight can be simulated, and the test equipment and device thereby adjusted for the simulated testing of bombs of the desired weight. The springs of different thickness may be readily substituted for that shown in Fig. 2 by removal of the pins at its forward and rearward terminals, and the pin in the central bearing element 39, either the cover 18 or one of the side sheets being removed to facilitate this charge.

It will accordingly be seen that a relatively simple testing fixture or device has been disclosed which can be quickly attached or removed from the conventional bomb rack without disturbing the mechanism thereof. The shackles 28 and 29 correspond with the bomb rings for the suspension of the bomb for which the loading spring 25 of any predetermined stiffness is substituted. With the improved device the bomb rack and its associated mechanism can also be tested upon the ground, or in various positions of the airplane without the necessity of attaching dummy or test bombs for these purposes. The test device is considerably lighter than the dummy bombs for which it is substituted and much less power and fuel is required to fly the airplane to the extreme heights at which the lower critical temperatures prevail, and at which it is desirable to test the bomb racks. Also, as the test device is carried back with the airplane and can again be cocked or loaded for further tests, it is not necessary to fly to remote areas where dummy bombs can be dropped without injury to the population, or ground structures.

While the present invention has been described in connection with the testing of aircraft bomb racks, it should be noted that the invention is equally applicable to many other types of releasing mechanisms such as are frequently utilized in aircraft. This testing fixture can be employed for checking the functioning of the supporting and releasing means for chemical and fuel tanks, jet-assisted take-off units, supplemental water-alcohol tanks such as are used for water injection installations on jet-engines, and the like. Shackles such as 28 and 29 are commonly used for attaching such releasable units to the airplane. Also, while it has been pointed out that the present test unit is intended primarily for checking the operation of a bomb rack under the low temperature conditions encountered at high altitudes, additional factors such as air load drag may be checked by providing an appropriate housing or fairing to simulate the bomb or tank casings, or by providing other means such as a plate having a frontal area calculated to develop the desired loading effects. This could be obtained for instance by merely extending the frontal area of member 11, Fig. 1.

Other forms and modifications of the invention both with respect to its general arrangement and the details of its respective parts, which may occur to one skilled in the art after reading the foregoing description, is intended to come within the scope and spirit of the present invention as more particularly set forth in the appended claims.

I claim:

1. A bomb rack testing device for aircraft having bomb-carrying hook means, comprising means for attaching the testing device to a bomb rack, a loading spring adjustably carried by said testing device, means for cocking said loading spring and means including spaced shackles releasably engageable with the bomb-carrying hook means under the influence of said loading spring arranged for the simulated bomb loading of said bomb rack hook means.

2. A bomb rack testing device for aircraft having bomb-carrying hook means, comprising means for attaching said testing device to a bomb rack, a loading spring operatively carried by said testing device, shackle elements in engagement with the ends of said loading spring and with said bomb rack hook means, and manual means for cocking said spring to simulate a bomb load upon said hook means.

3. A bomb rack testing device for aircraft having releasable bomb-carrying hook means, comprising means for attaching said testing device to a bomb rack, spring means adjustably supported upon said testing device, means connecting spaced portions of said spring means with said bomb rack hook means, and a swingable linkage assembly engageable with an intermediate portion of said spring means for cocking the same to simulate a bomb load upon said releasable hook means.

4. A test fixture for a bomb rack having hooks arranged for releasable engagement by a bomb, means for detachably fastening said test fixture to said bomb rack, shackle means movably carried by said test fixture arranged to engage said bomb rack hooks, resilient means pivotally engageable with said shackle means, manual means for cocking said resilient means arranged for simulating the bomb loading of said releasable bomb rack hooks, and electrical means carried by said test fixture for indicating the release of the simulated bomb load.

5. A test fixture for aircraft having a bomb rack including releasable bomb engaging hooks and an arming mechanism, comprising means for attaching said test fixture to said bomb rack, spring means operatively supported upon said test fixture, means for connecting spaced portions of said spring means with said bomb rack hooks, cocking means for deflecting said spring means and maintaining the same in a deflected position in which said spring means imposes a load upon said bomb rack hooks simulating the weight of a bomb, and means engageable with said spring means and said arming mechanism for testing said arming mechanism simultaneously with the said bomb rack hooks.

6. A bomb rack test device for aircraft having releasable hooks arranged for engagement by a bomb, comprising means for detachably fastening said testing device to said bomb rack, means carried by said testing device arranged for engagement with said bomb rack hooks, resilient means operatively carried by said testing device engageable with said hook engaging means, means including a lever pivotally mounted upon said test device for stressing said resilient means for simulating a predetermined bomb loading of said releasable bomb rack hooks and indicating means including an electrical contact switch arranged for engagement by said resilient means for remotely signalling the operation of said testing device.

7. A testing device for an aircraft releasing mechanism having load-carrying hooks, comprising means for attaching said testing device to said releasing mechanism, resilient means including an elongated flat bar operatively carried by said testing device, spaced portions of said resilient means in engagement with said load-carrying hooks, and means for applying a predetermined force to said resilient means for the simulated loading of said load-carrying hooks.

8. A bomb rack testing device for aircraft having bomb-carrying hooks and sway brace sockets, comprising stud means for attaching the testing device to the bomb rack sway brace sockets, a loading spring having opposed terminal portions adjustably carried by said testing device, said spring deflectable such that its terminal portions are engageable with said hooks, manual means for cocking said loading spring and means including shackle elements pivotally engaging said spring terminal portions under the influence of said deflectable spring arranged for the simulated bomb loading of said bomb rack hooks.

9. A bomb rack testing device for aircraft having bomb-carrying hook means and sway brace means, comprising stud means for attaching said testing device to the sway brace means, loading spring means adjustably supported upon said testing device, shackle elements in engagement with the ends of said loading spring means and with said bomb rack hook means, and manual means for adjusting said spring means with respect to said sway brace means to simulate a bomb load upon said hook means.

10. A bomb rack testing device for aircraft having bomb-carrying hooks, comprising means for attaching the testing device to a bomb rack, spring means pivotally supported upon said testing device, means including bored cylindrical studs connecting the respective ends of said spring means with said bomb rack hooks, and a swingable linkage assembly pivotally mounted upon the testing device engageable with an intermediate portion of said spring means for cocking the same to simulate an actual bomb load upon said releasable hooks.

11. A test fixture for a bomb rack having hooks arranged for releasable engagement with a bomb, means including post elements for detachably fastening said test fixture to said bomb rack, shackle means carried by said test fixture arranged to engage said bomb rack hooks, resilient means engageable with said shackle means arranged upon being deflected for simulating the bomb loading of said releasable bomb rack hooks, and manual lever means for cocking said resilient means by applying a deflecting force thereto.

12. A test fixture for aircraft having a bomb rack including releasable bomb engaging hooks and an arming mechanism, comprising means for attaching said test fixture to said bomb rack, spring means operatively supported upon said test fixture, shackle means for connecting spaced portions of said spring means with said bomb rack hooks, means including a lever pivotally mounted upon said test fixture for deflecting an intermediate portion of said spring means and maintaining the same in a deflected position in which said spring means through said shackle means imposes a load upon said bomb rack hooks simulating the weight of a bomb, and means pivotally mounted upon said test fixture engageable with said spring means and said arming mechanism for testing said arming mechanism simultaneously with the said bomb rack hooks.

13. A test device for an aircraft suspension rack having releasable hooks arranged for engagement with a suspended load comprising means for detachably fastening the testing device to said suspension rack, shackle means carried by said testing device arranged for engagement with said suspension rack hooks, resilient means operatively carried by said testing device engageable with said shackle means, lever means for deflectively stressing said resilient means for simulating a predetermined loading of said releasable hooks and indicating means arranged for engagement by said resilient means upon return to its initial unstressed condition for remotely signalling the operation of said testing device.

14. In aircraft, quickly attachable means for testing a load releasing mechanism including a frame, a deflectable member movably carried by said frame connected to said load releasing mechanism and manually rotatable means including a pair of pivotally interconnected bell-crank levers in engagement with said frame and said member for applying a separating force between the aircraft and said member for deflecting said member and applying a predetermined force upon said load releasing mechanism equivalent to the actual load for which the mechanism is tested, the pivotal interconnection of said levers arranged in such manner to retain said member in said deflected position.

15. In aircraft, quickly attachable means for testing a load releasing mechanism supported from an aircraft structure including a frame, a deflectable member movably carried by said frame suspended from said load releasing mechanism and manually actuated means including a pair of pivotally interconnected bell-crank levers in engagement with said frame and said member for applying a separating force between the aircraft structure and said deflectable member for exerting a predetermined load upon said releasing mechanism, the pivotal interconnection of said levers arranged in such manner to retain said member in said deflected position.

16. In an aircraft structure, means for testing a load releasing mechanism attached thereto including a resiliently deflectable member movably supported from the aircraft structure engageable with said load releasing mechanism, and cocking means including a toggle action lever pivotally supported from the aircraft structure, said cocking means engaging said deflectable member for applying a separating force between the aircraft structure and said member for deflecting said member and thereby subjecting said load releasing mechanism to a force equivalent to a given actual load for which the mechanism is tested, the pivotal support of said toggle lever arranged to retain said member in a deflected and cocked condition.

DANIEL E. HOLLOWAY.

References Cited in the file of this patent

UNITED STATES PATENTS

| Number | Name | Date |
| --- | --- | --- |
| 1,091,219 | Harvey | Mar. 24, 1914 |
| 2,049,235 | Tour et al. | July 28, 1936 |
| 2,362,210 | Markey | Nov. 7, 1944 |
| 2,376,886 | Smith | May 29, 1945 |